Aug. 13, 1968         R. O. BALOGH ETAL         3,396,852
                         DERRICK UNITS
Filed Oct. 19, 1966                          8 Sheets-Sheet 1

INVENTORS
ROY O. BALOGH
ROBERT G. BAKULA
BY
ATTORNEY

Aug. 13, 1968   R. O. BALOGH ET AL   3,396,852
DERRICK UNITS
Filed Oct. 19, 1966   8 Sheets-Sheet 2
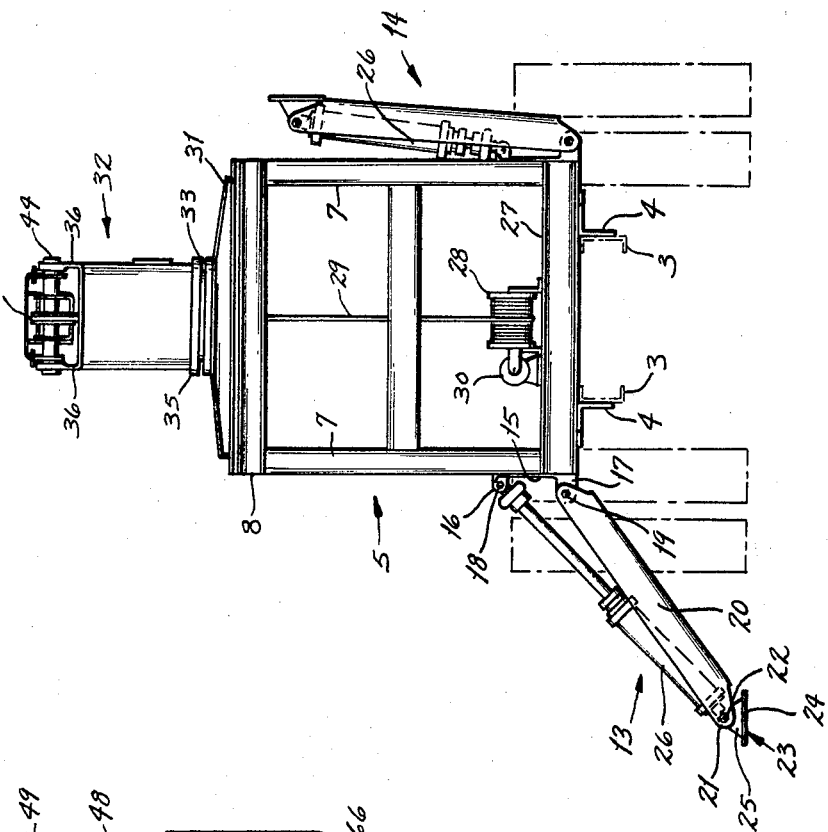
INVENTORS
ROY O. BALOGH
ROBERT G. BAKULA
BY
ATTORNEY

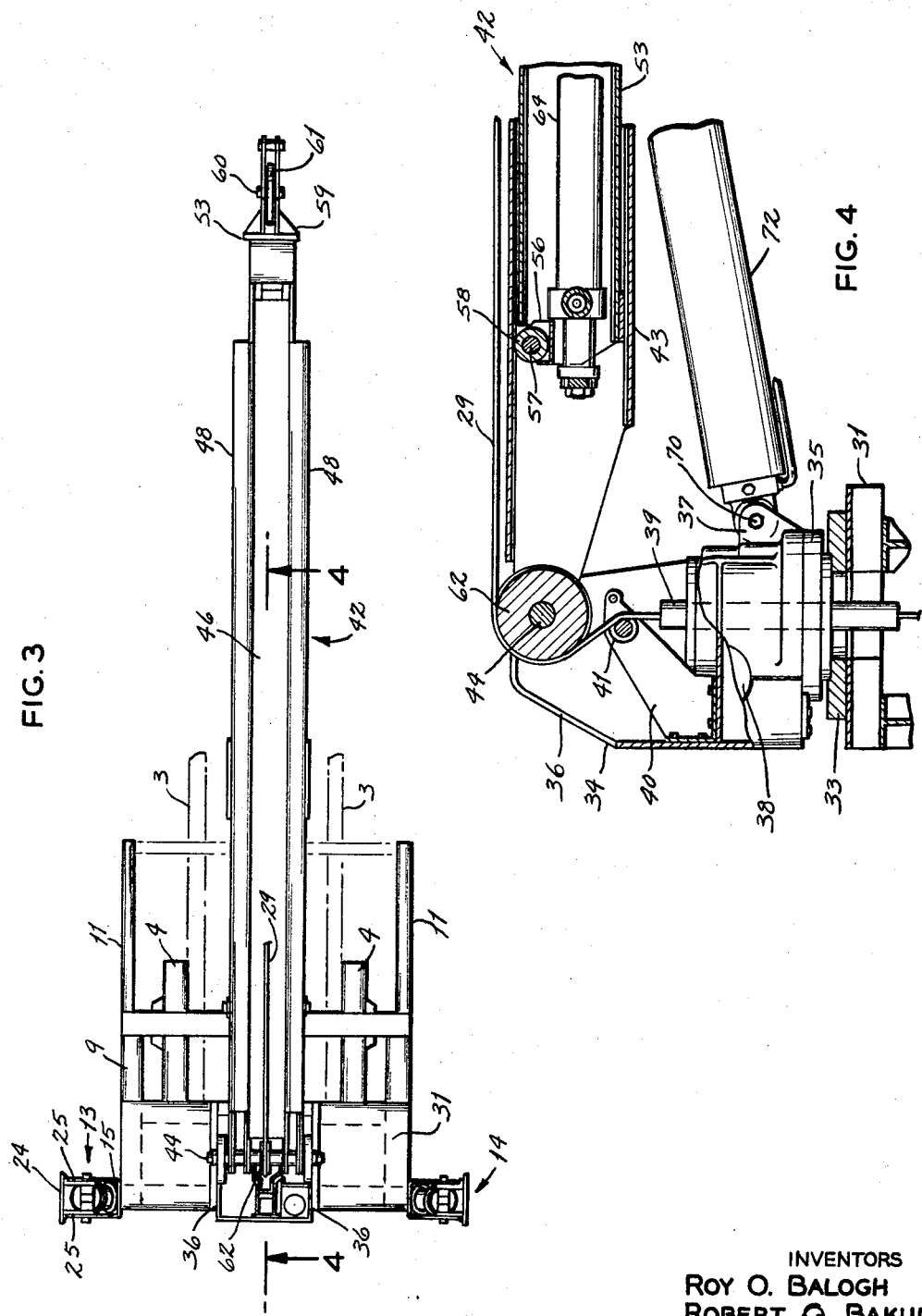

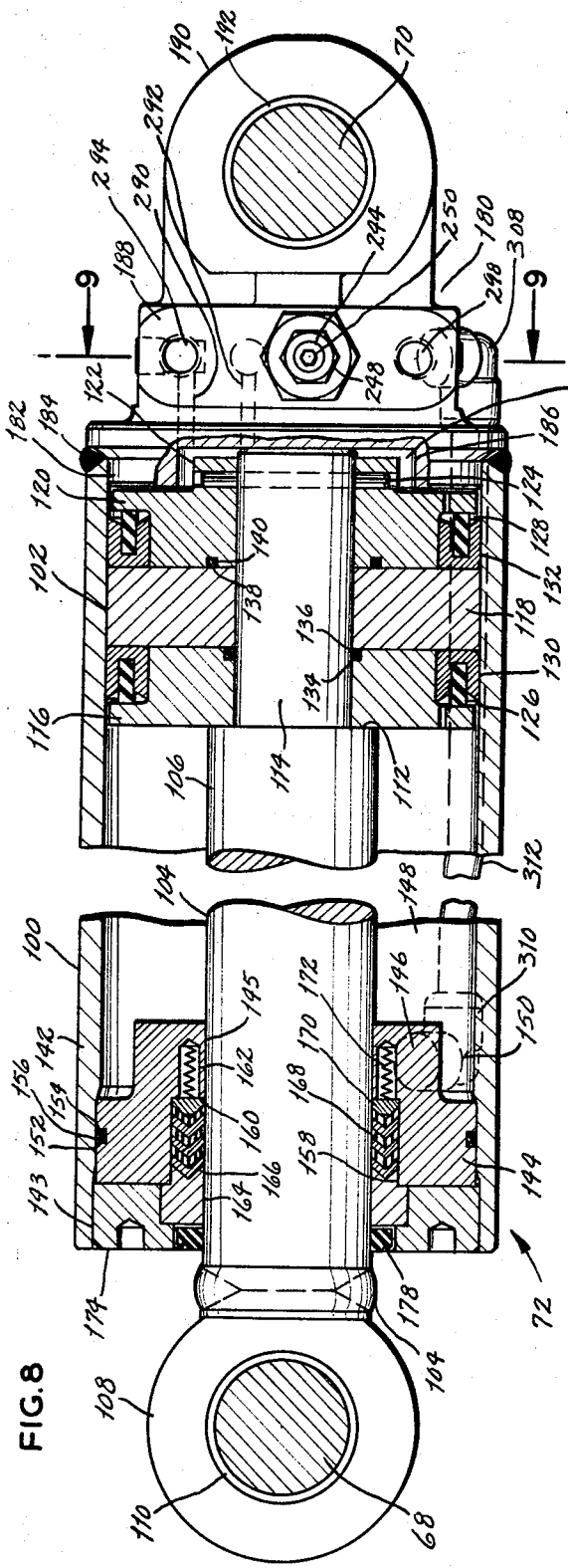

Aug. 13, 1968  R. O. BALOGH ETAL  3,396,852
DERRICK UNITS
Filed Oct. 19, 1966  8 Sheets-Sheet 5
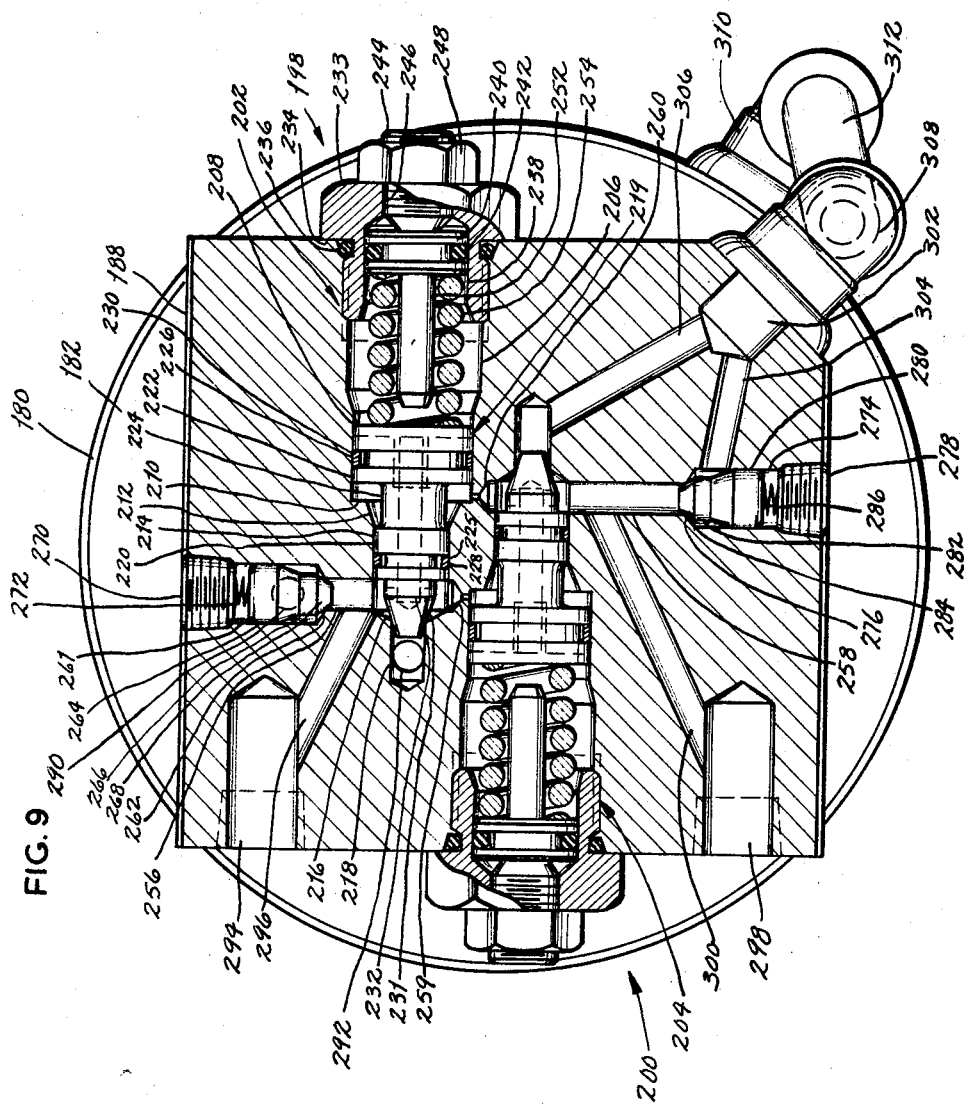
FIG. 9
INVENTORS
ROY O. BALOGH
ROBERT G. BAKULA
BY
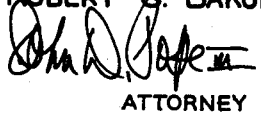
ATTORNEY

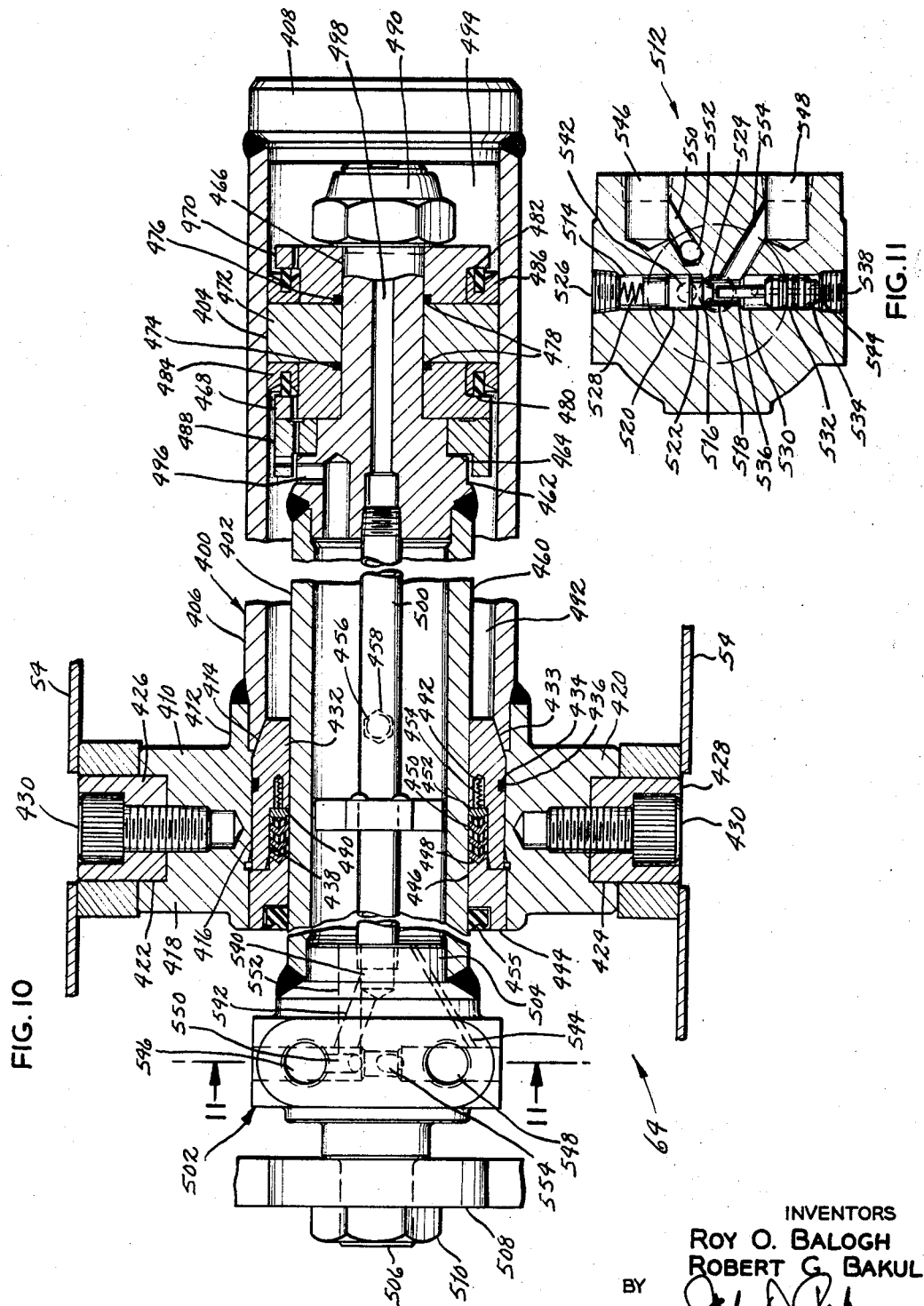

Aug. 13, 1968 R. O. BALOGH ET AL 3,396,852
DERRICK UNITS
Filed Oct. 19, 1966 8 Sheets-Sheet 7
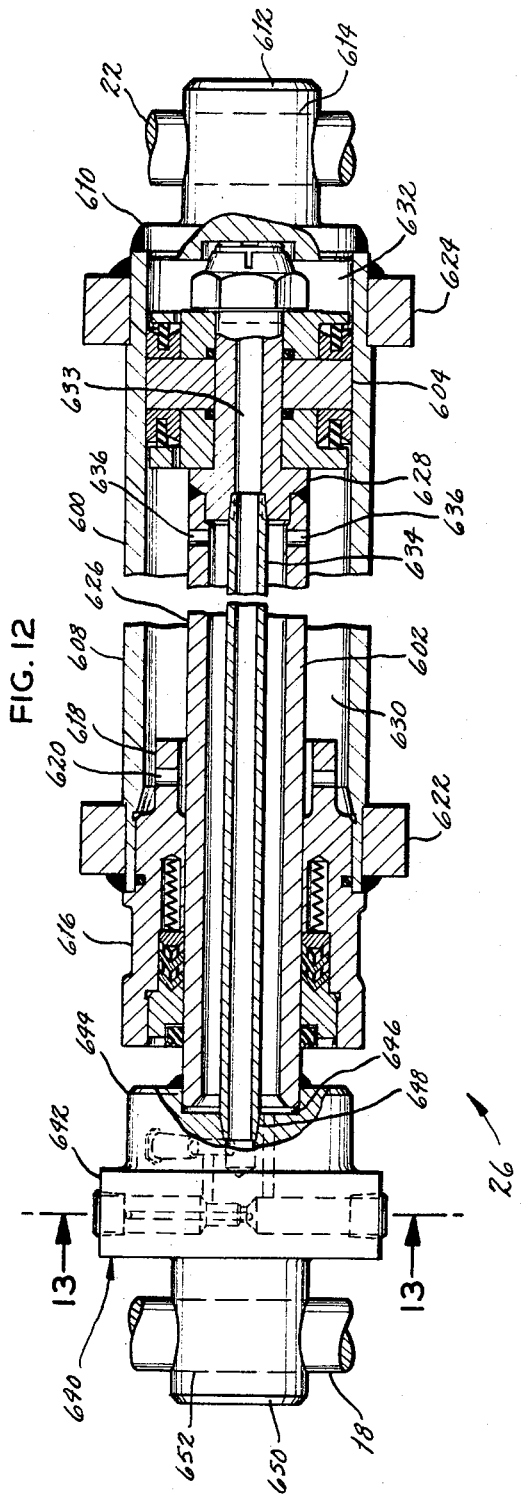
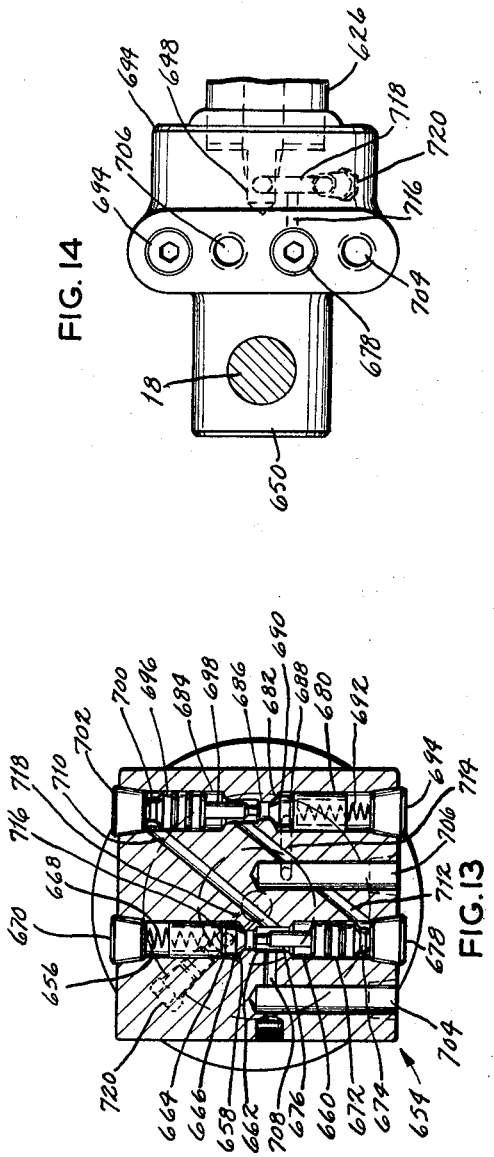
INVENTORS
ROY O. BALOGH
ROBERT G. BAKULA
BY
ATTORNEY

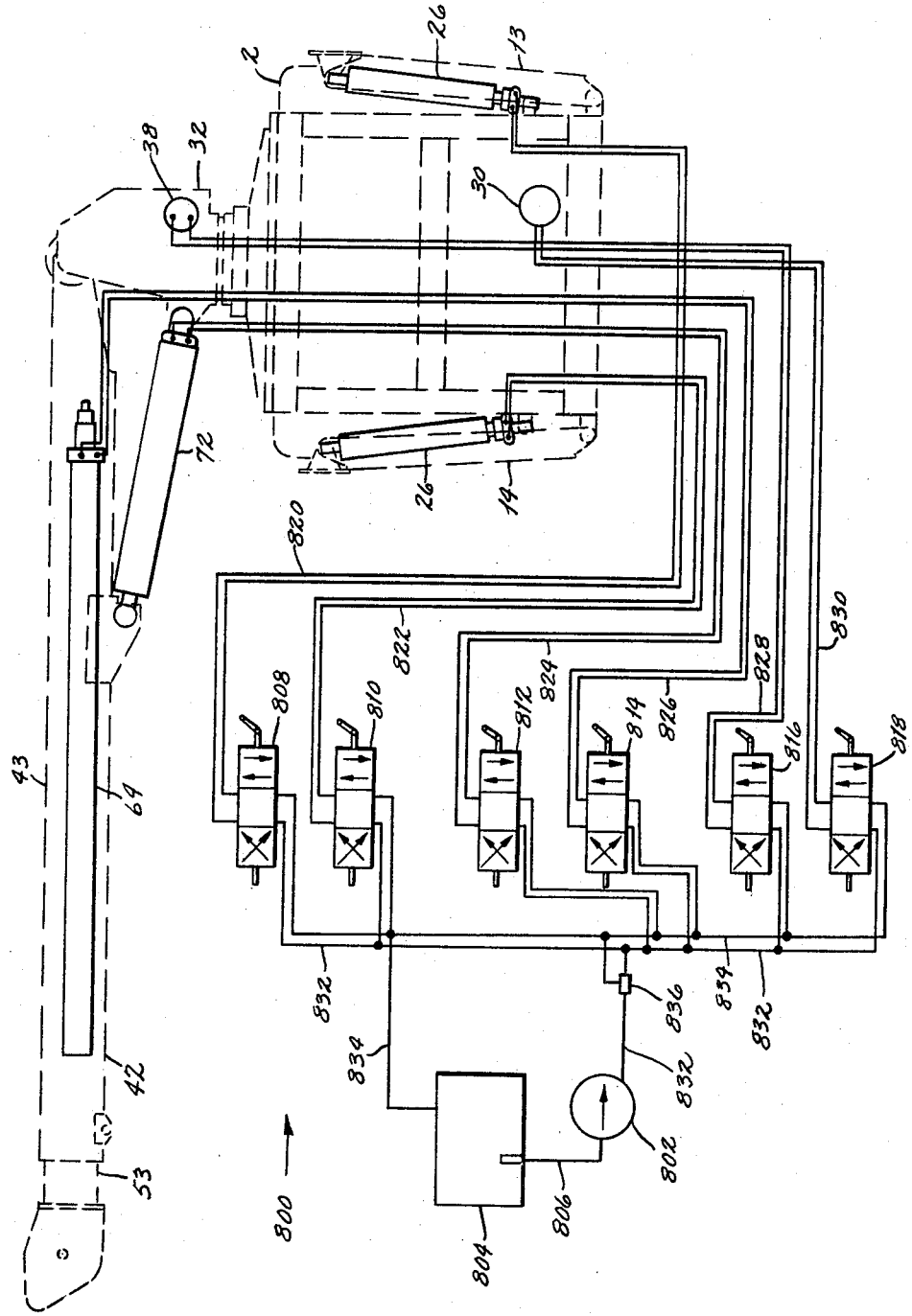
FIG. 15
INVENTORS
ROY O. BALOGH
ROBERT G. BAKULA
BY 
ATTORNEY United States Patent Office 3,396,852
Patented Aug. 13, 1968

3,396,852
DERRICK UNITS
Roy O. Balogh, Ladue, and Robert G. Bakula, Hanley Hills, Mo., assignors to McCabe-Powers Body Company, St. Louis, Mo., a corporation of Missouri
Filed Oct. 19, 1966, Ser. No. 587,826
23 Claims. (Cl. 212—35)

ABSTRACT OF THE DISCLOSURE

A derrick unit stabilized by outriggers and having a boom consisting of telescopic inner and outer beams, the former of which is pinned to a rotatable mast. The boom is elevated by an elevation cylinder having a barrel terminating at a valve block which is formed integral therewith and carries check valves and adjustable differential poppet valves, the latter of which normally block channels which bypass the check valves. Each differential poppet valve opens when the fluid pressure at the port in the valve block opposite the channel with which it is associated reaches a predetermined point or when the fluid pressure in the portion of the cylinder barrel communicating with it reaches a predetermined point. The outer beam is extended with respect to the inner beam by an extension cylinder having a valve block carried on and formed integral with the outer end of the piston rod, and contained within the valve block are a check valve and a pilot check piston which opens the check valve when the pressure at the opposite port in the valve block is elevated. The outriggers are raised and lowered by hydraulic outrigger cylinders each having a valve block carried on and formed integral with its piston rod. Each valve block contains pairs of check valves and pilot check pistons which function similarly to their counterparts in the extension cylinder.

---

This invention relates to new and useful improvements in derricks and, more particularly, to rotatable derrick units which are adapted for use on trucks and similar mobile platforms.

Many industrial organizations such as public utilities use service or maintenance trucks which are provided with some type of rotatable derrick for lifting heavy objects and performing a multitude of other functions. Generally speaking, these units include a mast assembly having a boom swingably mounted thereon. The inclination of the boom and, of course, the height of its outer end is normally controlled by a hydraulic elevation cylinder interposed between the mast and boom. Often such booms are provided with an extensible beam telescopically mounted therein for further varying the location of the outer end of the beam beyond the truck, the beam being extended or retracted by means of a hydraulic extension cylinder linking it and the non-extending portion of the boom. Such units are normally provided with outriggers of one sort or another for stabilizing the truck when the derrick unit is being used. Hydraulic outrigger cylinders are often used to lower the outriggers into, maintain them in, and retract them from their ground-engaging position.

Derrick units of current manufacture employ conventional hydraulic cylinders which are connected to a suitable pump and oil reservoir by means of a plurality of hydraulic lines having manually operable control valves located therein for controlling the amount and direction of flow of oil through the lines to the cylinders. Pilot-operated check valves are usually interposed in such lines remote from the cylinders to hold the boom, extensible beam or outrigger in position, if for some reason the pump should fail. Inasmuch as these check valves are located in the fluid lines, any rupture or leak in the line between the cylinder and check valve will cause the component actuated by the particular cylinder associated with the ruptured line to yield under whatever force may be applied to it. Since such units often lift heavy objects, remotely located check valves are a hazard. Furthermore, when an excessive load is applied to the boom of a conventional derrick unit, the conventional check valves in the lines supplying the elevation cylinder tend to allow small spaced quantities of fluid to escape from the cylinder or in other words they "flutter" thereby inducing surges of pressure which damage other components of the hydraulic system.

The present invention relates to a derrick unit having a rotatable mast mounted on a supporting structure which is rigidly secured to the frame of a truck or other platform. Swingably mounted on the mast is a boom including an inner beam having an extensible beam slidably mounted therein for telescopic movement. The extensible beam is actuated by a hydraulic extension cylinder integrally including a pilot-operated check valve formed as part of the cylinder's piston. Interposed between the inner beam and mast for controlling the angular position of the former is a hydraulic elevation cylinder including an adjustable counterbalance valve formed integral with the base of the barrel of such cylinder. The counterbalance valve allows fluid to escape from the cylinder in a continuous flow when a predetermined pressure is reached so that the cylinder will yield and thereby allow the boom to slowly depress before the structural limits of such boom and associated components are reached. The supporting structure also mounts a set of outriggers which are maintained in selected positions by pilot-operated check valves located in the pistons of such cylinders.

Among the several objects of the present invention may be noted the provision of a derrick unit having a boom which will automatically depress at a relatively slow rate when a predetermined moment is applied to it; the provision of a derrick unit having a boom actuated by a hydraulic-elevation cylinder which can be adjusted to yield under varying pressures; the provision of a derrick unit having a boom which will remain in a load-supporting position if the hydraulic lines leading to the elevation cylinder rupture; a derrick unit having a boom provided with an extensible beam which will remain in an extended position if the hydraulic lines leading to the extension cylinders rupture; the provision of a derrick unit having outriggers which will remain in a ground-engaging stabilizing position if the lines leading to the outrigger cylinders rupture; the provision of a derrick unit which is rugged in construction and easy to manufacture; and the provision of a derrick unit which is versatile, easy, and safe to operate. Other objects and features will be in part apparent and in part pointed out hereinafter.

The invention accordingly comprises the constructions hereinafter described, the scope of the invention being indicated in the following claims.

In the accompanying drawings, in which one of various possible embodiments of the invention is illustrated, FIG. 1 is a side elevational view of a rotatable derrick unit constructed in accordance with and embodying the present invention, the derrick unit being suitably mounted on a truck;

FIG. 2 is a sectional view taken along line 2—2 of FIG. 1;

FIG. 3 is a plan view of the derrick unit;

FIG. 4 is a fragmentary sectional view taken along line 4—4 of FIG. 3;

Figure 1:
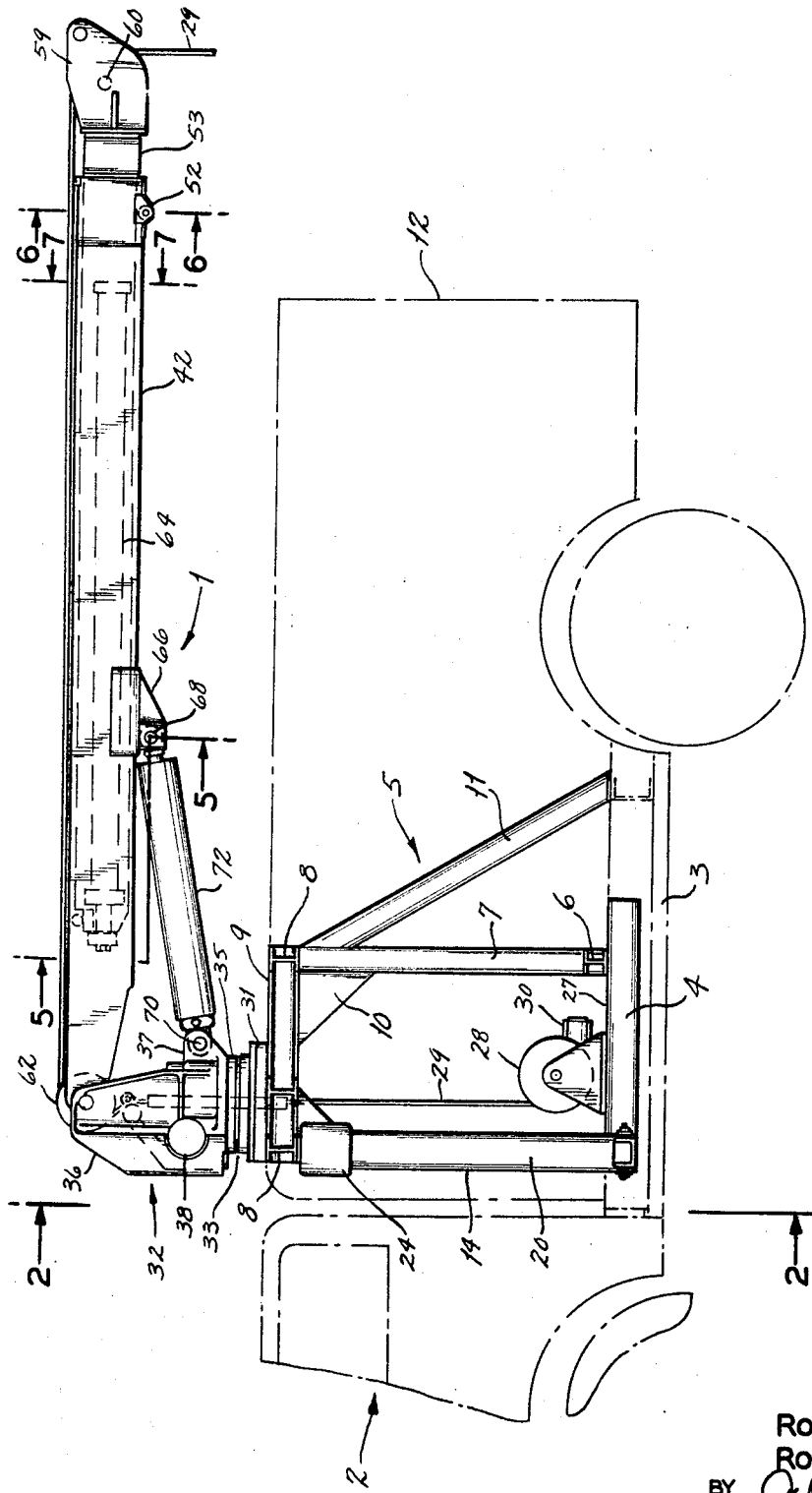

FIGS. 5, 6, and 7 are sectional views taken along lines 5—5, 6—6, and 7—7, respectively, of FIG. 1;

FIG. 8 is a longitudinal sectional view of an elevational cylinder forming part of the present invention;

FIG. 9 is a sectional view taken along line 9—9 of FIG. 8;

FIG. 10 is a longitudinal sectional view of an extension cylinder forming part of the present invention;

FIG. 11 is a sectional view taken along line 11—11 of FIG. 10;

FIG. 12 is a longitudinal sectional view of an outrigger cylinder forming part of the present invention;

FIG. 13 is a sectional view taken along line 13—13 of FIG. 12;

FIG. 14 is a fragmentary elevational view of the extension cylinder; and

FIG. 15 is a schematic circuit diagram of the hydraulic system forming part of the present invention.

Corresponding reference characters indicate corresponding parts throughout the several views of the drawings.

Referring now in more detail and by reference characters to the drawings, which illustrate a preferred embodiment of the present invention, 1 designates a single boom derrick unit which is suitably mounted on a conventional truck 2, the latter being shown in dotted lines in FIG. 1. Truck 2 is provided with a pair of lengthwise extending frame members 3 and welded to the exterior vertical walls thereof are support angles 4 which form a foundation for a derrick support frame 5, the latter including a pair of spaced transversely extending cross-bars 6. Rigidly secured to the transverse ends of cross-bars 6 are four uprights 7. Welded to the upper ends of each of the two forward uprights 7 and extending transversely thereacross is an upper cross-bar 8, and similarly welded to the upper ends of each of the two rear uprights 7 and extending transversely thereacross is another upper cross-bar 8. Interconnecting each of the cross-bars 8 at their transverse margins is a pair of lengthwise extending support members 9 which are supported by gusset plates 10, the latter being welded to the underside of support members 9 and to uprights 7. The pair of rear uprights 7 can further be supported by a pair of rearwardly and downwardly extending braces 11 which are bolted or otherwise secured at their lower ends to frame members 3 forming part of truck 2. Cross-bars 6, 8, and uprights 7 are preferably formed from any standard H-shaped rolled steel. As shown in FIG. 1, support frame 5 can be suitably enclosed within a truck body 12 forming part of truck 2.

Opertaively mounted on the outwardly presented faces of the two forward uprights 7 are outriggers 13, 14, which are identical. Therefore, only outrigger 13 will be described herein in detail.

Outrigger 13 includes an outrigger bracket 15 which is bolted or otherwise rigidly fastened to forward upright 7 and is integrally provided with outwardly projecting lugs 16, 17, which carry upper and lower horizontally disposed pins 18, 19, respectively. Journaled at one end on lower pin 19 is an outrigger link 20 which is provided at its opposite end with a bifurcated bracket 21. Pivotally connected to bifurcated bracket 21 by means of a horizontal pin 22 extending therethrough is an outrigger shoe 23 including a foot plate 24 and upstanding bifurcation-forming mounting ears 25 which fit on each side of bifurcated bracket 21 and are further journaled thereto by pin 22. Also pivotally connected to pin 22 intermediate the furcations of bifurcated bracket 21 is a double-acting hydraulic outrigger cylinder 26. The opposite end of cylinder 26 is journaled to bracket 15 at lugs 16 by means of upper pin 18. When cylinder 26 is in a retracted position, outrigger 13 is in a so-called transport position in which link 20 is located in juxtaposition to forward upright 7. Extension of outrigger cylinder 26 lowers link 20 and brings foot plate 24 of outrigger shoe 23 into engagement with the ground, thereby providing lateral support for derrick unit 1 and truck 2, as best seen in FIG. 2.

Extending between and welded to the upper faces of support angles 4 is a transversely extending support plate 27 and bolted or otherwise rigidly secured to the upper face thereof is a cable winch 28 having a cable 29 trained therearound, winch 28 being powered by a suitable hydraulic winch motor 30. Inasmuch as winch 28 and motor 30 are conventional, they are neither illustrated nor described in detail herein.

Rigidly secured to the upper end of derrick support frame 5 and transversely extending between lengthwise extending members 9 is an upper horizontal support plate 31 for supporting a mast assembly 32. Mast assembly 32 includes a mast support 33 which is rigidly secured to support plate 31 and rotatably mounted thereon is a mast turret 34 having a base 35 provided with a pair of upstanding ears 36, and a laterally projecting bifurcated bracket 37 located intermediate the spaced parallel planes defined by ears 36. Mast turret 34 carries a hydraulic motor 38 which, through suitable gearing, engages mast support 33 and rotates the former. Secured to base 35 and extending coaxially therethrough to a terminal point below support plate 31 is a protective sleeve 39 through which cable 29 extends. Also fastened to base 35 is a bracket 40 on which an idler pulley 41 is journaled in upwardly spaced and aligned relation to the upper end of protective sleeve 39.

Pivotally mounted on mast assembly 32 is a derrick boom 42 including an inner beam 43 having its one end journaled intermediate upstanding ears 36 of turret 34 by means of a pin 44. As will be seen by reference to FIG. 5, inner beam 43 is formed with a rectangular cross-section and consists of a pair of U-shaped channels 45 having a pair of longitudinally extending connecting plates 46 welded to the upper and lower flanges thereof, thereby forming an elongated compartment 47. Also welded to plates 46, and extending laterally outwardly therefrom, is a set of U-shaped channels 48 having vertical walls which are spaced outwardly from the vertical walls of channels 45, thereby defining a pair of rectangular side compartments 49 for retaining hydraulic lines, the latter not being shown. At the outer end of inner beam 43, lower connecting plate 46 is cut away and welded to the vertical walls of channels 45. In juxtaposition thereto are depending plates 50 which are transversely connected by a pin 51 having a roller 52 journaled thereon, the outer peripheral surface of roller 52 extending partially into elongated compartment 47, as best seen in FIG. 6.

Telescopically mounted within elongated compartment 47 of inner beam 43, and also forming a part of derrick boom 42, is an outer or extensible beam 53 comprising a pair of U-shaped channels 54 having a pair of longitudinally extending connecting plates 55 welded to the inwardly projecting opposed flanges thereof, as best seen in FIG. 7. Lower plate 55 rides on roller 52 while at the inner end of beam 53, upper plate 55 and channels 54 are partially cut away for reception of a roller bracket 56 which is welded thereto. Bracket 56 includes a transversely extending pin 57 which rotatably carries a roller 58, the outer periphery of roller 58 extending slightly beyond the upper surface of upper plate 55 where it bears against the inwardly presented faces of the flanges of channels 54, as best seen in FIGS. 4 and 5. The presence of rollers 52, 58, enables outer beam 53 to move freely within elongated compartment 47 of inner beam 43 with little resistance even when outer beam 53 is subjected to substantial loading. As its outer end outer beam 53 carries a sheave block 59 having a pin 60 on which a sheave 61 is journaled. Also journaled on pin 44, intermediate the vertical walls of channels 45 at turret 34, is a sheave 62. Cable 29 extends upwardly from protective sleeve 39 where it engages idler pulley 41 and thereafter is trained around sheave 61. From sheave 61, cable 29 extends longitudinally over the upper surface of connecting plate 46 to sheave 61 over which it is trained and depends therefrom.

Mounted internally within outer beam 53 and projecting into compartment 47 of inner beam 43, to which it is also secured, is a double-acting hydraulic extension cylinder 64 which will subsequently be described in detail. It is sufficient at this point to note that extension cylinder 64 moves outer beam 53 longitudinally with respect to inner beam 43, thereby varying the position of sheave block 59 as well as the depending end of cable 29 beyond truck 2.

Welded to bottom plate 46 and outer channels 48 intermediate the ends of inner beam 43 is a downwardly presented mounting clevis 66. Interposed between mounting clevis 66 and bracket 37 and pinned in between the furcations thereof by means of pins 68, 70, is a double-acting hydraulic elevation cylinder 72 which varies the angular position of boom 42.

Referring now to FIGS. 8 and 9, elevation cylinder 72 includes a cylindrical barrel 100 and a piston 102 slidably mounted therein, the latter of which is secured to a piston rod 104 which projects axially beyond the one end of barrel 100. Piston rod 104 includes a cylindrical shank portion 106 which is rigidly provided at its outer end with an enlarged cylindrical mounting block 108 having a suitable bushing 110 fitted therein. Mounting block 108 fits snugly between the outwardly projecting furcations of mounting clevis 66 and is journaled thereto by means of pin 68 which extends through bushing 110 thereby swingably securing elevation cylinder 72 at its one end to inner beam 43. At its inner end, shank portion 106 is turned down in the provision of a shoulder 112 and a diametrally reduced portion 114 which carries piston 102. Piston 102 includes an outer backing plate 116 which abuts against shoulder 112, an intermediate plate 118 and an inner backing plate 120 having an axially extending boss 122 protruding from its outwardly presented end face. Transversely extending through boss 122 and the end of diametrally reduced portion 114 is a lock pin 124 which holds backing plates 116, 120, and intermediate plate 118 in stacked relation on piston rod 104. As will be seen by reference to FIG. 8, the cylindrical side face of intermediate plate 118 engages the inwardly presented surface of barrel 100 while the side faces of backing plates 116, 120, are set slightly inwardly therefrom and are further partially turned down in the formation of spaced annular recesses 126, 128, which accept seals 130, 132, respectively, seals 130, 132, being sandwiched in recesses 126, 128, between intermediate plate 118 and backing plates 116, 120. Also, backing plate 116 is provided with a small annular recess 134 at its inner margin for accepting an O-ring 136, and similarly backing plate 120 is relieved adjacent the end face of intermediate plate 118 in the provision of an annular recess 138 which accepts an O-ring 140.

Barrel 100 includes a cylindrical sleeve 142 which snugly but slidably accepts piston 102, the internal face of sleeve 142 being wiped by seals 130, 132, as well as by the cylindrical side face of intermediate plate 118. At its one end, sleeve 142 is reamed out in the formation of a diametrally enlarged end portion 143 which tapers into and thereby merges with the normal bore of sleeve 142. Fitted into diametrally enlarged end portion 143 of sleeve 142 is an annular cylinder head 144 having a central bore 145 which snugly but slidably accommodates shank portion 106 of piston rod 104. The outer surface of cylinder head 144 engages the inner surface of end portion 143 and forwardly conforms to the taper thereof so as to preclude inward axial displacement of head 144 in sleeve 142. Near its inner end, cylinder head 144 is provided with a fluid port 146 which inwardly terminates in a fluid chamber 148 defined by the inwardly presented faces of sleeve 142, backing plate 116 and cylinder head 144. At its outer end, fluid port 146 registers with an aperture 150 formed in the wall of sleeve 142 to establish communication with fluid chamber 148. The outer cylinder surface of cylinder head 144 is relieved in the provision of a groove 152 which accommodates an O-ring 154 and a back-up ring 156 for establishing a fluid-tight seal between the abutting faces of head 144 and diametrally enlarged end portion 143 of sleeve 142. From its outwardly presented end, cylinder head 144 is counterbored or otherwise relieved in the formation of a diametrally enlarged recess 158 which terminates at a shoulder 160 into which are drilled a plurality of axially extending circumferentially spaced bores 162. Threadedly secured to cylinder head 144 is a gland nut 164 which encircles shank portion 106 of piston rod 104 and extends into recess 158, terminating therein at a V-shaped annular groove 166. Interposed within recess 158 between groove 166 and shoulder 160 is a V-packing 168 and male adapter ring 170, the latter of which is urged toward gland nut 164 by means of springs 172 retained within axial bores 162. It is readily apparent that springs 172 compress V-packing 168, causing it to expand and engage the cylindrical surface of shank portion 106 so as to form a fluid-tight seal between piston rod 104 and barrel 100. Disposed in abutting relation to gland nut 164 and cylinder head 144 is a retaining ring 174 which is held securely in place by means of cap screws or other suitable means. Retaining ring 174 further carries an elastomeric rod wiper 178 which wipes the surface of shank portion 106 as it emerges from the end of barrel 100.

At its opposite end barrel 100 is provided with a valve block 180 having an inwardly presented end portion 182 which is turned down so as to fit snugly within the end of sleeve 142 to which it is secured by means of a peripheral weld 184. The inwardly presented face of end portion 182 is centrally relieved in the provision of a shallow axially extending recess 186 for accommodating boss 122 on piston 102 when piston rod 104 moves to its fully retracted position. On its opposite face, end portion 182 integrally merges into a somewhat rectilinear intermediate section 188 which in turn integrally merges into a substantially cylindrical mounting block 190, the latter being internally fitted with a transversely extending bushing 192. Mounting block 190 fits between furcations of bracket 37 located on mast turret 34, mounting block 190 being journaled thereto by means of pin 70 which extends through bushing 192.

As will be seen by reference to FIG. 9, valve block 180 carries two differential poppet valves 198, 200, mounted in valve chambers 202, 204, respectively, which extend inwardly into intermediate section 188 from opposite sides thereof in offset relation to one another. Inasmuch as poppet valves 198, 200, and valve chambers 202, 204, are identical to one another, only valve 198 and chamber 202 will be described herein in detail. Valve chamber 202 immediately inwardly from the side face of intermediate section 188 comprises an enlarged threaded bore 206 which at its end tapers into an outer valve cylinder 208 which terminates at a shoulder 210. Beyond shoulder 210 outer valve cylinder 208 merges into a tapered connecting portion 212 which opens into a diametrally reduced coaxial inner valve cylinder 214 located in axially spaced relation to outer cylinder 208. The inner end of valve cylinder 214 is defined by a tapered valve seat 216, beyond which inner cylinder 214 opens into a coaxial terminal bore 218.

Poppet valve 198 includes a differential poppet 219 having inner and outer valve pistons 220, 222, which slidably engage the cylindrical faces of inner and outer valve cylinders 214, 208, respectively, inner and outer pistons 220, 222, being integrally connected by a diametrally reduced intermediate connecting portion 224 located for axial movement in juxtaposition to tapered connecting portion 212 of valve chamber 202. The cylindrical faces of inner and outer valve pistons 220, 222, are provided with annular grooves 225, 226, respectively, for reception of piston rings 228, 230, respectively, rings 228, 230, being preferably formed from alloy steel or some other suitable metal. Projecting coaxially beyond the end face of inner piston 220 is a truncated tapered end portion 231 which engages seat 216 when poppet 219 is urged inwardly, thereby preventing communication between inner valve cylinder 214 and terminal bore 218. Poppet 219 is centrally provided with a longitudinally extending channel 232 which establishes commuication between inner cylinder 214 and threaded bore 206.

Threaded into threaded bore 206 is an end plug 233 having an outwardly projecting shoulder 234 which urges an O-ring 236 into engagement with valve block 180 in surrounding relation to the terminal end of threaded bore 206 to prevent the escape of hydraulic fluid therefrom. Plug 233 is centrally bored from its inwardly presented end face in the provision of an axially extending bore 238 which slidably accepts a small piston 240 having a grooved cylindrical face for accommodating an O-ring 242 so as to prevent the seepage of fluid past it. The outwardly presented face of piston 240 abuts against a coaxially protruding set screw 244 which engages the threads of a threaded aperture 246 formed in the end of plug 233. The outwardly projecting end of set screw 244 carries a jam nut 248 and is further provided with a hexagonal or other suitable socket 250. On its other end, piston 240 is integrally provided with a coaxially projecting guide stud 252 which maintains a valve spring 254 in the proper position, valve spring 254 being interposed between piston 240 and poppet 219 for urging tapered end portion 231 into engagement with valve seat 216. It will be readily apparent that the force which spring 254 exerts on poppet 219 is dependent on the axial position of piston 240 which can be varied by loosening jam nut 248 and turning set screw 244 with an Allen wrench or other suitable socket-engaging drive.

Through its outer opposed side faces intermediate section 188 is drilled perpendicularly to the axis of valve chambers 202, 204, in the formation of fluid supply bores 256, 258, which intersect inner valve cylinders 214 of chambers 202, 204, respectively, adjacent to tapered valve seats 216 thereof. Bore 256 extends beyond inner valve cylinder 214 of valve chamber 202 in the provision of a diametrally reduced connecting part 259 which opens into outer valve cylinder 208 of valve chamber 204 adjacent shoulder 210 thereof. Similarly, bore 258 extends beyond inner valve cylinder 214 of valve chamber 204 in the provision of a reduced connecting port 260 which opens into outer valve cylinder 208 of valve chamber 202. Thus, inner valve cylinder 214 of valve chamber 202 is in communication with the outer valve cylinder 208 of valve chamber 204 and vice-versa.

Near its outwardly presented end, bore 256 is enlarged in the formation of a terminal poppet cylinder 261 which merges into bore 256 at a tapered valve seat 262. Slidably mounted within poppet cylinder 261 is a poppet 264 having a diametrally reduced forward portion 266 which terminates in a tapered truncated end portion 268. Adjacent the side face of mounting block 190 poppet cylinder 261 is threaded to accept a closure plug 270 and interposed between plug 270 and poppet 264 is a coil spring 272 which normally biases end portion 268 into sealingwise engagement with valve seat 262. Similarly, bore 258 is enlarged in the provision of a terminal poppet cylinder 274 which inwardly terminates at a tapered valve seat 276 and is closed at its opposite end by means of an end plug 278. Slidably fitted within cylinder 274 is a poppet 280 having a diametrically reduced forward portion 282 and a tapered end portion 284 which is normally biased into sealingwise engagement with valve seat 276 by means of a coil spring 286.

Extending through valve block 180 from poppet cylinder 261 to the inwardly presented face of end portion 182 where it opens into a fluid chamber 288 defined by the inwardly presented faces of sleeve 142, end portion 182 and piston 102, is a fluid duct 290 which intersects poppet cylinder 261 in close proximity to valve seat 262 and in juxtaposition to reduced forward portion 266 of poppet 264. Also communicating with the fluid chamber 288 in spaced parallel relation to fluid duct 290 is a fluid duct 292 which terminates at its other end in terminal bore 218 of valve chamber 202 beyond valve seat 216.

In close proximity to poppet cylinder 261 intermediate section 188 is provided with a fluid port 294 which communicates with bore 256 through a diagonally extending fluid passage 296. Similarly, in close proximity to the poppet cylinder 274 valve block 180 is further provided with another port 298 which communicates with bore 258 through a diagonally extending passage 300.

The corner of intermediate section 188 located between differential poppet valve 198 and poppet cylinder 274 is beveled off and provided with a port 302 which communicates with terminal bore 218 of valve chamber 204 and poppet cylinder 274 by means of diagonally extending fluid channels 304, 306, respectively, the latter of which terminates at cylinder 274 in close proximity to valve seat 276 and in juxtaposition to reduced forward portion 282 of poppet 280. Threaded into port 302 is an elbow-forming fitting 308 and similarly connected to fluid port 146 of annular cylinder head 144 at the opposite end of barrel 100 is another elbow-forming fitting 310. Interconnecting fittings 308, 310, is a longitudinally extending externally mounted fluid line 312.

When it is desired to extend piston rod 104 and thereby elevate derrick boom 42, high-pressure hydraulic fluid is supplied to port 294 of valve block 180 by means of a hydraulic system which is connected to ports 294, 298. The high-pressure fluid flows through fluid passage 296 into bore 256 where it bears against the inner end of poppet 264 urging the same outwardly against the bias of spring 272 and causing tapered end portion 268 to lift away from valve seat 262. Fluid then flows into poppet cylinder 261 around diametrally reduced forward portion 266 of poppet 264 and from there into fluid duct 290 from which it is discharged into chamber 288 causing piston 102 to move toward annular cylinder head 144 at the opposite end of barrel 100. At the same time, the high-pressure of the incoming fluid is transmitted in the opposite direction through bore 256, inner cylinder 214 of chamber 202, and connecting port 259 to the fluid in outer valve cylinder 208 of valve chamber 204 wherein it exerts a force on the inwardly presented face of outer piston 222 so as to urge poppet 219 outwardly in chamber 204 against the bias of spring 254. As poppet 219 moves outwardly, tapered end portion 231 withdraws from its seat 216, thereby establishing communication between diagonal channel 304 and bore 258.

As piston 102 moves piston rod 104 to an extended position, fluid chamber 148 decreases in volume, the fluid therein being forced out of it through port 146 at relatively low-pressure. That fluid is transferred to valve block 180 through external connecting line 312 which discharges it into port 302 where it flows into channel 304, past valve seat 216, and around tapered end portion 231 of poppet 219 located in inner cylinder 214 of valve chamber 204. The low-pressure fluid discharges from inner cylinder 214 into bore 258 and thence to passage 300 and port 298 where it leaves valve block 180.

Should it be desired to retract piston rod 104, an opposite sequence of events occurs. High-pressure fluid is introduced into port 298, which fluid finds its way into bore 258 through passage 300, the fluid lifting poppet 280 and flowing through fluid channel 306. From there the high-pressure fluid enters port 302 from which it is transferred through connecting line 312 and port 146 to chamber 148 wherein it acts on piston 102 urging it toward valve block 180. Contemporaneously, the high-pressure is transferred to the fluid in outer valve cylinder 208 of valve chamber 202 through inner valve cylinder 214 of chamber 204 and through connecting port 260 whereby poppet 219 located therein moves outwardly and lifts its tapered end portion 231 away from seat 216. Thus, low-pressure fluid can escape from chamber 288 through duct 292 and terminal bore 218 of valve chamber 202 from which it passes into inner cylinder 214 of chamber 202 and thence to bore 256, passage 296 and port 294 where it leaves valve block 180.

In the event an excessive downwardly directed load is applied to boom 42, piston 102 and rod 104 will be urged toward the retracted position thereby increasing the pressure in chamber 288. This increase in pressure is transferred through duct 292 to terminal bore 218 of valve chamber 202 where it acts upon the faces of tapered end portion 231 protruding inwardly beyond the point of engagement with valve seat 216. At a predetermined pressure, the fluid force exerted on poppet 219 located in chamber 202 will overcome the force exerted on it by spring 254, whereupon poppet 219 will move outwardly allowing fluid to escape from chamber 288. As the high-pressure fluid escapes from chamber 288, piston rod 104 retracts and boom 42 depresses. Poppet 264 is subjected to the same high-pressure through duct 290 and poppet cylinder 261. The size of reduced forward portion 266 thereof and the strength of spring 272 are such that topered end portion 268 will remain in engagement with valve seat 262. Thus, poppet 264 serves as a one-way valve. The same is true of poppet 280. It is important to note that when the predetermined pressure is reached, poppet valve 198 allows a continuous stream of fluid to escape, thereby permitting boom 42 to depress slowly so as to afford sufficient time for an individual working beneath or near the load to move out of its path. Moreover, poppet 219 does not flutter and thereby avoids causing rapid fluctuations of stresses within boom 42 and associated components, which stresses could exceed the structural limits of boom 42 or components and cause permanent damage thereto. For the same reason, excessive hydraulic surges of pressure in the hydraulic system of the present invention do not occur, thereby eliminating a source of rupture to the lines. It is also important to note that the predetermined pressure at which poppet valve 198 will allow fluid to escape from chamber 288 can be adjusted merely by loosening jam nut 248 and rotating set screw 244. In this manner, the force spring 254 exerts on poppet 219 is varied. It is apparent that the maximum tensile force that may be applied to elevation cylinder 72 is dependent on the setting of poppet valve 200 which functions in a manner identical to poppet valve 198. Furthermore, differential poppet valves 198, 200, and poppets 264, 280, lock the hydraulic fluid within chambers 148, 288. Thus, if the pressure at port 294 is suddenly reduced as the result of the rupture of a fluid line leading to it, differential poppet valve 198 and poppet 264 will prevent fluid from entering bore 258 so as to hold boom 42 in the position at which it was when the line broke. The same principle applies to differential poppet valve 200 and poppet 280 when the pressure at port 298 is suddenly reduced.

Referring now to FIGS. 10 and 11, extension cylinder 64 includes a cylindrical barrel 400 which slidably receives a piston rod 402 having a piston 404 secured to the inner or distal end thereof. Barrel 400 includes a cylindrical sleeve 406 which slidably receives piston 404, the outer end of sleeve 406 being sealed by an outer cylinder head 408 which is preferably welded thereto. At its opposite or inner end, sleeve 406 is provided with a mounting collar 410 integrally including a forwardly projecting annular portion 412 which snugly receives the end of sleeve 406 and is welded or otherwise securely joined thereto. At the juncture of sleeve 406 and collar 410, the internal surfaces thereof are beveled outwardly in the provision of a continuous tapered shoulder 414 which outwardly merges into a cylindrical bore 416, the terminal portion of which is threaded. On its outer surface collar 410 is provided with two diametrally opposed axially aligned outwardly projecting cylindrical bosses 418, 420, having cylindrical recesses 422, 424, which snugly accept outwardly projecting coaxial trunnions 426, 428, which are secured to bosses 418, 420, by means of countersunk socket head cap screws 430. As will be seen by reference to FIG. 7, trunnions 426, 428, fit within sockets 429 secured to U-shaped channels 54 of extenisble beam 53, thereby securing barrel 400 to extensible beam 53 for movement together. Snugly fitted within bore 416 is an annular cylinder head 432 having a tapered end portion 433 which conforms with the taper of and abuts against tapered shoulder 414 so as to limit forward axial displacement of cylinder head 432. On its outer cylindrical surface cylinder head 432 is relieved in the provision of an annular groove 434 which accepts an O-ring 436 so as to prevent leakage of hydraulic fluid between collar 410 and cylinder head 432. Cylinder head 432 is further counterbored from its outer end in the provision of an outwardly opening recess 438 which terminates at a shoulder 440 having a plurality of circumferentially spaced holes 442 extending axially inwardly therefrom. Threaded into the terminal portion of bore 416 is a gland nut 444 having an inwardly projecting annular nose 446 which projects into recess 438 of cylinder head 432 where it terminates at an annular V-shaped groove 448. Interposed between groove 448 and shoulder 440 is a V-packing 450 and an annular adapter 452 which is urged against packing 450 by means of springs 454 located in holes 442. Gland nut 444 further engages a rod wiper 455 which, along with packing 450, wipes the outer surface of piston rod 402. Mounting collar 410 on its underside is provided with a bleed port 456 which communicates with the interior of barrel 400 and is normally closed by means of a bleed plug 458 threaded therein.

Piston rod 402 includes a tubular shank portion 460 located in slidable engagement with cylinder head 432, packing 450 and gland nut 444. Welded to the inner or distal end of shank portion 460 is a coaxially projecting piston mount 462 having a stepped shoulder 464 and a diametrally reduced end portion 466 projecting coaxially therefrom, reduced end portion being threaded at its outer end. Mounted on reduced end portion 466 are annular backing plates 468, 470, the opposed end faces of which are located in facewise abutment with an annular intermediate plate 472. The center bores of backing plates 468, 470, are relieved adjacent intermediate plate 472 in the provision of recess 474, 476, which accept O-rings 478 so as to prevent leakage of fluid along diametrally reduced end portion 466. Along their outer peripheries adjacent intermediate plate 472, backing plates 468, 470, are similarly relieved in the provision of opposed enlarged recesses 480, 482, into which U-cup packings 484, 486, are fitted. Mounted on stepped shoulder 464 adjacent backing plate 468 is an annular spacer 488 which projects rearwardly toward cylinder head 432. It should be noted that the outer cylindrical face of intermediate plate 472 as well as packings 484, 486, wipe the inner face of sleeve 406, inasmuch as they are in slidable and sealingwise engagment therewith, while the outer peripheral faces of backing plates 468, 470, and spacer 488 are disposed slightly inwardly therefrom. Spacer 488, backing plate 468, intermediate plate 472, and backing plate 470 are all held on piston mount 462 in the foregoing stacked order by means of a lock nut 490 which engages the threads on the end of reduced portion 466. Thus, it can be seen by reference to FIG. 10, that piston 404 internally divides barrel 400 into two fluid chambers 492, 494. Piston mount 462 is also provided with an offset port 496 which establishes communication between the interior of tubular shank portion 460 and chamber 492, port 496 opening into the latter adjacent spacer 488, the rearwardly projecting portion of which is located slightly outwardly from and partially covers the terminal portion of port 496. Piston mount 462 is centrally provided with a longitudinally extending duct 498 which opens at one end into chamber 494 and at its other end is attached to a coaxial tubular conduit 500 disposed within shank portion 460 of piston rod 402.

Welded or otherwise suitably affixed to the outwardly presented or proximal end of shank portion 460 is a substantially rectilinear valve block 502 integrally including an inwardly projecting cylindrical nose portion 504 which snugly engages the interior cylindrical surface of shank portion 460. On its opposite end, valve block 502 is centrally provided with a cylindrical outwardly projecting integral threaded mounting boss 506. Mounting boss 506 is secured to a mounting collar 508 by a nut 510. Collar 508 is rigidly affixed to channels 45 of inner beam 43.

Intermediate boss 506 and nose portion 504, valve block 502 carries and, in fact, forms part of a pilot-operated check valve 512. More particularly, as will be seen by reference to FIG. 11, valve block 502 is inwardly bored from one of its side faces in the provision of a poppet cylinder 514 which terminates at a taper valve seat 516 where it opens into a coaxial connecting port 518. Slidably fitted within poppet cylinder 514 is a poppet 520 having a diametrally reduced forward portion 522 which merges into a tapered end portion 524 adapted to engage seat 516 when poppet 520 is at its innermost extremity. Threaded into the outer end of poppet cylinder 514 is a plug 526 and interposed between plug 526 and poppet 520 is a coiled compression spring 528 which urges tapered end portion 524 into engagement with seat 516.

Valve block 502 is further drilled from its opposite face in the provision of a coaxial pilot check cylinder 530 which opens into connecting port 518. Slidably mounted within cylinder 530 is a pilot check piston 532 which forms a slidable, but substantially fluid-tight seal with the surface of cylinder 530. At its outer end pilot check piston 532 is turned down in the provision of a diametrally reduced portion 534 while on its opposite end it is integrally provided with a coaxially projecting nose portion 536 which protrudes into connecting port 518. Threaded into the end of cylinder 530 is a plug 538. When piston 532 is presented at the outer end of cylinder 530, that is when the end of diametrally reduced portion 534 abuts plug 538, the free end of nose portion 536 will be located in close proximity to tapered end portion 524 of poppet 520. Thus, when an inwardly directed force is applied to the outer end of piston 532, it will move inwardly within cylinder 530 and engage poppet 520, lifting tapered end portion 524 of the latter off seat 516.

Turning now to FIG. 10, it will be seen that tubular conduit 500 at its proximal end is fitted within a center port 540 located within nose portion 504 of valve block 502, and interconnecting port 540 and poppet cylinder 514 at a point adjacent seat 516 is a diagonal fluid duct 542. Similarly connecting pilot check cylinder 530 at a point adjacent plug 538 and the interior of tubular shank portion 460 is a diagonal fluid passage 544.

Drilled inwardly from a third face of valve block 502 are ports 546, 548, the former of which is connected by means of a diagonal duct 550 to a longitudinally extending duct 552 which opens into the interior of piston rod 460 at a point remote from port 540. The other port 548 communicates with connecting port 518 interposed between cylinders 514 and 530 through a diagonal duct 554.

To extend extensible beam 53, fluid is supplied to port 548 under pressure by means of a hydraulic system. The fluid passes through diagonal duct 554 to connecting port 518 where it exerts an outwardly directed force on that part of end portion 524 of poppet 520 projecting beyond seat 516, thereby urging poppet 520 outwardly against the bias of spring 528. The high-pressure fluid then flows past seat 516 and into poppet cylinder 514 where it flows around diametrally reduced forward portion 522 and exits through diagonal duct 542 which discharges the fluid into center port 540. From center port 540, the high-pressure fluid enters tubular conduit 500 and thereafter longitudinally extending duct 498 of piston mount 462 from which it is discharged into chamber 494 where it exerts an axial force on cylinder head 408 thereby moving barrel 400 with respect to piston 404 and piston rod 402. Inasmuch as extensible beam 53 is secured to barrel 400 at trunnions 426, 428, beam 53 telescopes outwardly from inner beam 43.

As barrel 400 moves outwardly chamber 492 decreases in size, the fluid therein which is under nominal pressure finds its way out through port 496 which discharges it into the interior of shank portion 460 of piston rod 402. At the other end of shank portion 460 the low-pressure fluid enters valve block 502 through longitudinally extending duct 552 from which it discharges into diagonal duct 550 and thence port 546 where it leaves extension cylinder 64.

If for some reason the fluid line leading to port 548 should suddenly rupture or the fluid pressure at that point should otherwise suddenly decrease, barrel 400 will remain stationary at the particular point at which it was when the pressure decreased, inasmuch as pilot-operated check valve 512 precludes the hydraulic fluid from flowing reversely out of block 502 and thereby creates a fluid lock within chamber 494. When the pressure at port 548 decreases suddenly spring 528 will urge poppet 520 inwardly until tapered end portion 524 thereof engages seat 516. When this occurs no fluid can flow reversely through poppet cylinder 514 and out through connecting port 518, duct 554 and port 548. Thus, poppet 520 serves as a unidirectional check valve. Inasmuch as pilot-operated check valve 512 is located within extension cylinder 64 and forms an integral part of such cylinder, the danger from rupture of lines interconnecting the check valve and cylinder associated with conventional derricks is eliminated. Thus, extensible beam 53 will not slam back into its original position if a fluid line ruptures or the hydraulic fluid pressure is otherwise suddenly reduced at port 548.

When it is desired to retract beam 53, fluid under pressure is introdced into port 546 where it passes into diagonal duct 550 and thence longitudinally extending duct 552 which discharges it into the interior of shank portion 460. The high-pressure fluid leaves shank portion 460 through offset port 496 in piston mount 462 where it is discharged into chamber 492. The pressurized fluid within chamber 492 exerts an axial force on annular cylinder head 432 thereby urging barrel 400 to its retracted position which, in turn, carries extensible beam 53 to its retracted position. In this connection it is important to note that at the extended end of the stroke, spacer 488 abuts against the inwardly presented annular end face of cylinder head 432 thereby preventing the bore thereof from totally covering and sealing offset port 496. Thus chamber 492 is always vented to the interior of shank portion 460.

Simultaneously with the introduction of high-pressure fluid into port 546, the increased pressure induced in the interior of shank portion 460 is transmitted through diagonal fluid passage 544 to the outer end of pilot check cylinder 530 where the pressurized fluid acts upon pilot check piston 532 urging it inwardly and causing projecting nose portion 536 thereof to engage tapered end portion 524 of poppet 520 moving it away from its seat 516. Thus, as long as increased pressure is maintained within the interior of shank portion 460 fluid is free to flow reversely out of chamber 494 through the same ports, ducts, and the like previously described. However, once the pressure at port 546 is reduced, spring 528 urges poppet 520 inwardly and tapered end portion 524 engages seat 516 thereby again locking hydraulic fluid with chamber 494.

Referring now to FIGS. 12 through 14, outrigger cylinder 26 includes a barrel 600, a piston rod 602, and a piston 604, all of which are very similar to barrel 400, piston rod 402 and piston 404, respectively, of extension cylinder 64. It is, therefore, sufficient for purposes of the present disclosure to briefly note that barrel 600 includes a sleeve 608 having cylinder head 610 mounted on and sealing its one end, head 610 being integrally provided with a coaxially projecting cylindrical boss 612 having a transversely extending hole 614 which receives pin 22 for pivotal securement of barrel 600 to outrigger link 20 and shoe 23. Threaded into the opposite end of barrel 600 is an annular cylinder head 616 which slidably receives piston rod 602 and integrally includes an inwardly protruding annular abutment located in spaced relation to and intermediate barrel 600 and piston rod 602. Annular abutment 618 is provided with a plurality of radially extending holes 620. With the exception of annular abutment 618 and the threaded engagement with the end of barrel 600, annular cylinder head 610 is substantially identical to cylinder head 432 and will, therefore, not be described in greater detail. Welded to and surrounding sleeve 608 at each end are reinforcing rings 622, 624. Piston rod 602 includes a tubular shank portion 626 having a piston mount 628 welded to and projecting coaxially from one end. Mounted on piston mount 628 is piston 604 which is similar in construction and design to piston 404. Piston 604 wipes the inner surface of sleeve 608, forming a fluid-tight seal therewith, and thereby internally divides barrel 600 into two fluid chambers 630, 632. Piston mount 628 is further centrally provided with a longitudinally extending fluid passage 633 which opens at one end into chamber 632 and is fitted at its other end with a tubular conduit 634 which extends concentrically within the interior of tubular shank portion 626. Adjacent piston mount 628, shank portion 626 is provided with radially extending ports 636 which establish communication between chamber 630 and the interior shank portion 626. Other differences between barrels 400, 600, piston rods 402, 602, and pistons 406, 606, are minor in nature and can readily be ascertained from a comparison of FIGS. 10 and 12.

At its outwardly presented or proximal end tubular shank portion 626 of piston rod 602 carries a valve block 640 including a substantially rectangular intermediate portion 642 having a cylindrical end portion 644 projecting from one end thereof, end portion 644 being centrally provided on its end face with an inwardly extending recess 646 which snugly accepts the end of shank portion 626, end portion 644 and shank portion 626 being welded or otherwise securely fastened to one another. End portion 644 is further provided with a center port 648 which snugly accepts the outer end of tubular conduit 634 forming a fluid-tight seal therewith. Projecting from the opposite end face of intermediate portion 642 and formed integral therewith is a coaxial cylindrical mounting boss 650 having a transversely extending hole 652 which accepts pin 18 for pivotal securement of piston rod 602 to outrigger bracket 15.

Turning now to FIG. 13, intermediate portion 642 of valve block 640 carries and forms part of a pilot-operated check valve 654 which, when not actuated, will lock hydraulic fluid in both chambers 630, 632, thereby rigidly locking barrel 600 in position on piston rod 602. More particularly, intermediate portion 642 is drilled inwardly from one of its side faces in the formation of a poppet cylinder 656 which inwardly terminates at a tapered valve seat 658. From its opposite side intermediate portion 642 is further provided with a coaxial inwardly extending pilot check cylinder 660 which terminates at a connecting port 662 located between and interconnecting cylinders 656, 660. Loosely fitted within poppet cylinder 656 is a poppet 664 having an inwardly projecting tapered end portion 666 which is biased against seat 658 by a valve spring 668, the outer end of which bears against a plug 670 threaded or otherwise fitted into the end of cylinder 656 in closure-forming relation therewith. Slidably mounted within pilot check cylinder 660 is a pilot check piston 672 having a diametrally reduced outer end portion 674 and a forwardly projecting coaxial nose portion 676 which protrudes into connecting port 662. The end of cylinder 660 is fitted with a closure plug 678. It should be noted that when end portion 674 abuts against plug 678, that is when piston 672 is at the outer extremity of its stroke, the inner end of nose portion 676 will be presented within connecting port 662 in close proximity to tapered end portion 666 of poppet 664. Thus, when pilot check piston 672 is forced inwardly, nose portion 676 will engage poppet 664 and lift tapered end portion 666 thereof away from seat 658.

Similarly, in spaced parallel relation to cylinders 656, 660, the intermediate portion is provided with an identical, but reversely positioned, structure including a poppet cylinder 680, a tapered valve seat 682, a pilot check cylinder 684, and an intermediate connecting port 686. Loosely fitted within poppet cylinder 680 is a poppet 688 which has a tapered end portion 690 for engaging valve seat 682, poppet 688 being urged toward seat 682 by a spring 692 which at its outer end bears against a closure plug 694. Similarly mounted within pilot check cylinder 684 is a pilot check piston 696 having an inwardly projecting nose portion 698 and a diametrally reduced end portion 700 which abuts against a closure plug 702 when piston 696 is at the outer extremity of its stroke.

Adjacent to and in outwardly spaced parallel relation from pilot check cylinder 660 intermediate portion 642 is provided with a port 704 and similarly intermediate cylinders 660, 680, it is provided with another port 706. Interconnecting the inner end of port 704 and connecting port 662 is a transversely extending duct 708. Also opening into connecting port 662 at its one end and opening at its other end into pilot check cylinder 684 adjacent closure plug 702 is a diagonally extending channel 710. Similarly interconnecting connecting port 686 and pilot check cylinder 660 adjacent plug 678 is another diagonally extending channel 712 which, intermediate its ends, intersects port 706. The exterior of tubular shank portion 626 of piston rod 602 is in communication with poppet cylinder 680 at a point adjacent valve seat 682 through a rearwardly extending channel 714 located partially within cylindrical end portion 644 of valve block 640. Extending rearwardly from cylinder 656, at a point adjacent valve seat 658, is a longitudinally extending channel 716 which extends into cylindrical end portion 644 where it opens into a radially extending bore 718 which, in turn, connects with center port 648, bore 718 being closed at its outer end by a suitable plug 720.

When it is desired to lower outrigger 13 and thereby bring shoe 23 into a ground-engaging position, high-pressure fluid is supplied to port 704 by a hydraulic system. The high-pressure fluid passes through transversely extending duct 708, enters connecting port 662 and bears against the inwardly protruding portion of poppet 664, thereby urging tapered end portion 666 away from seat 658 against the bias of spring 668. The fluid thereupon enters poppet cylinder 656 from which it is discharged into longitudinally extending channel 716, thence to radial bore 718 and center port 648. From center port 648 the high-pressure fluid enters tubular conduit 634 which discharges it into longitudinally extending fluid passage 633 of piston mount 628 from which it is, in turn, discharged into chamber 632 where it exerts an axial force on cylinder head 610, thereby extending barrel 600 with respect to piston rod 602 and lowering outrigger 13 so as to bring shoe 23 into a ground-engaging position.

Upon the introduction of high-pressure hydraulic fluid in port 704, the elevated pressure thereof is transmitted through the fluid in diagonally extending channel 710 to the outer end of pilot check cylinder 684 to exert an inwardly directed axial force on pilot check cylinder 696, thereby urging nose portion 698 thereof into engagement with that portion of poppet 688 protruding beyond valve seat 682. The force generated by the high-pressure moves pilot check piston 696 further inwardly and lifts tapered end portion 690 of poppet 688 away from valve seat 682. This vents chamber 630 and enables the relatively low-pressure fluid therein to escape in order through radial ports 636, the interior of tubular shank portion 626, rearwardly extending channel 714, poppet cylinder 680, connecting port 686, diagonally extending channel 712, and into port 706 from which it is discharged from valve block 640.

Similarly, if it is desired to retract barrel 600 and thereby raise outrigger 13 to its transport position, high-pressure hydraulic fluid is introduced into port 706 from which it finds its way into connecting port 686 through diagonally extending channel 712. The fluid in the connecting port acts upon poppet 688 urging it outwardly against the bias of spring 692 and away from seat 682. The fluid thereupon enters poppet cylinder 680 from which it ultimately finds its way into the interior of tubular shank portion 626 through rearwardly extending channel 714. The fluid subsequently leaves shank portion 626 through radial ports 636 and enters chamber 630 where it exerts an axial force upon the inwardly presented end of annular cylinder head 616, thereby urging barrel 600 into a retracted position. In this connection, it should be noted that if barrel 600 is in the fully extended position, piston 604 will abut against annular abutment 618 leaving radial ports 636 unobstructed and free to discharge fluid into chamber 630. Moreover, when in such a position fluid can find its way to the opposite or outer side of annular abutment 618 through radially extending holes 620 located therein.

Contemporaneously with the introduction of high-pressure fluid into port 706 the elevated pressure of such fluid is transmitted through diagonally extending channel 712 to pilot check cylinder 660 adjacent plug 678 where it exerts an inwardly directed force on pilot check piston 672, causing it to engage poppet 664 and lift tapered end portion 666 thereof away from seat 658. Thus, relatively low-pressure fluid in chamber 632 escapes therefrom in order through passage 633, tubular conduit 634, center port 648, radial bore 718, longitudinally extending channel 716, poppet cylinder 656, connecting port 662, transversely extending duct 708, and into port 704 where it is discharged from valve block 640.

When no pressure is applied to the fluid at ports 704, 706, poppets 664, 688, move inwardly and engage their respective valve seats 658, 682, thereby preventing the escape of fluid from chambers 630, 632. Fluid escaping from chamber 632 must ultimately flow through poppet cylinder 656 and past poppet 664. However, if tapered end portion 666 of poppet 664 remains in engagement with seat 658 the fluid attempting to escape gets no further than poppet cylinder 656 where it urges poppet 664 into tighter engagement with seat 658. The same, of course, is true of poppet 688. Thus, once barrel 600 is extended to an operative position, ports 704, 706, can be vented or otherwise placed at reduced pressure and outriggers 13, 14, can be left unattended with the assurance that fluid will not leak past some manually operated valve and alter their position. Moreover, if one of the hydraulic lines leading to ports 704, 706, suddenly ruptures while under pressure, pilot-operated check valve 654 will lock fluid within chambers 630 and 632 and thereby maintain outriggers 13, 14, in the position they were in at the time of rupture.

Furthermore, in view of the fact that pilot-operated check valve 654 is an integral part of outrigger cylinder 26 no hydraulic lines are present which, when inadvertently cut or otherwise ruptured, will allow fluid to leak out of chambers 630, 632, and cause an outrigger to change its position. Cylinders 26 render derrick unit 1 considerably safer than derrick units of current design and manufacture, inasmuch as outriggers 13, 14, will not give way under load or through rupture of the hydraulic lines leading to them and allow a heavy outwardly suspended load to topple truck 2.

Referring now to FIG. 15, rotatable derrick unit 1 is suitably provided with a hydraulic system 800 including a fluid pump-motor combination 802 which is connected to a fluid reservoir 804 by means of a fluid line 806. Mounted on support frame 5 is a bank of six hydraulic two-way three-position control valves 808, 810, 812, 814, 816, 818, which are connected to the terminal ports of outrigger cylinders 26 of outriggers 13, 14, elevation cylinders 72, extension cylinder 64, hydraulic motor 38, and winch motor 30, respectively, by pairs of hydraulic lines 820, 822, 824, 826, 828, 830, respectively. Control valves 808, 810, 812, 814, 816, 818, are further connected to pump-motor combination 802 through a high-pressure line 832 and are each vented to reservoir 804 by means of a low-pressure line 834.

Interposed within high-pressure line 832 as it enters the bank of control valves, is a high-pressure hydraulic relief valve 836 which discharges fluid into low-pressure line 834 when a predetermined pressure is reached with line 832.

Thus, to stabilize truck 2, outriggers 13, 14, are individually lowered into engagement with the ground by manipulating control valves 808, 810, which direct fluid to the outrigger cylinders 26 thereof. Thereafter, boom 42 can be swung laterally about the axis of mast assembly 32 by manipulating control valve 814 which directs fluid to hydraulic motor 38. Boom 42 can be raised or lowered by manipulating control valve 812 which actuates elevation cylinder 72. Similarly the longitudinal extension of extensible beam 53 beyond the end of inner beam 43 is controlled by control valve 814 which is in communication with extension cylinder 64 through fluid lines 826. Control valve 818 controls winch motor 30 and the length of cable 29 depending from sheave 61.

It is also possible to mount control valves 812, 814, 816, 818, on the mast turret 34 so that the operator can turn with mast turret 34 and boom 42 as they rotate so as to have an unobstructed view in all positions of the load attached to cable 29. Such a modification would involve installation of a hydraulic swivel fitting within mast assembly 32.

If for some reason, the load applied to boom 42 should become excessive, the increased pressure induced within barrel 100 of elevation cylinder 72 will be transmitted to valve block 180 where it will urge differential poppet 219 of poppet valve 198 outwardly and allow a small amount of fluid to escape through one of lines 824 as previously noted. As the fluid escapes boom 42 will depress slowly and steadily. Also when control valves 808, 810, 812, 814, are in the neutral position fluid will be locked in the respective cylinders to which they are connected. Similarly if for some reason hydraulic lines 820, 822, 824, 826, 828, 830, or high-pressure line 832 should rupture the respective cylinders or other components to which they are attached will not collapse, as previously noted. Accordingly, workmen standing or working near derrick unit 2 will be safe and need not worry about outriggers 13, 14, giving way and thereby toppling truck 2, or boom 42 suddenly depressing, or extensible beam 53 slamming back to its original position.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A lifting unit comprising a support frame; a mast assembly supported by the support frame; a boom journaled to the mast assembly for rotation thereon; and a hydraulic cylinder interconnecting the boom and mast assembly at points remote from the journaled connection of the boom and mast assembly for varying the vertical angle of the boom with respect to the mast assembly; said hydraulic cylinder comprising a barrel, a piston rod slidably mounted in the barrel, a piston mounted on the inner end of the piston rod and dividing the barrel into first and second chambers, a valve block forming an integral part of the cylinder and being provided with a first port and a first duct which is connected at its one end to the first port and communicates with the first chamber at its other end, the valve block being further provided with a second port and second duct which is connected at its one end to the second port and is in communication with the second chamber at its other end, and a first check valve carried by the valve block and interposed in the first duct for permitting fluid to flow into the first chamber but for preventing the reverse flow of fluid out of the first duct and first port.

2. A lifting unit according to claim 1 and further characterized by a first differential poppet valve carried in the valve block and comprising an outer cylinder, an inner cylinder which is in communication with the first port, a first differential poppet integrally including an inner piston, an outer piston, and an end portion projecting beyond the inner piston, the inner and outer pistons being slidably mounted within the inner and outer cylinders, respectively, the inner cylinder terminating at a first valve seat, a first terminal bore located beyond the first valve seat and being in communication with the first chamber, first spring means for biasing the first differential poppet so that the end portion thereof is normally urged into sealingwise engagement with the first valve seat, and a conduit interconnecting the second port and outer cylinder of the first poppet valve so that the pressure at the second port will be transmitted to fluid in the outer cylinder of the first poppet where it will act upon the outer piston, whereby when the pressure at the second port is increased or when the fluid in the first chamber reaches a predetermined pressure the first differential poppet will move against the bias exerted by the spring means and withdraw the end portion from the first seat so that fluid from the first chamber can escape through the inner cylinder and first port.

3. A lifting unit according to claim 2 and further characterized by a second differential poppet valve carried in the valve block and comprising an outer cylinder, an inner cylinder which is in communication with the second port, a second differential poppet integrally including an inner piston, an outer piston, and an end portion projecting beyond the inner piston, the inner and outer pistons being slidably mounted within the second inner and outer cylinders, respectively, the second inner cylinder terminating at a second valve seat, a second terminal bore located beyond the second valve seat and being in communication with the second chamber, second spring means for biasing the second differential poppet so that the end portion thereof is urged into sealingwise engagement with the second valve seat, said unit being further characterized by a first connecting port interconnecting the first outer cylinder and the second inner cylinder so that the pressure at the second port will be transmitted to fluid in the first outer cylinder where it will act upon the first outer piston, and a second connecting port interconnecting the second outer cylinder and the first inner cylinder so that pressure at the first port will be transmitted to the fluid in the second outer cylinder where it will act upon the second outer piston.

4. A lifting unit according to claim 1 wherein the valve block is mounted on the end of the barrel and forms an integral part thereof.

5. A lifting unit according to claim 1 wherein the hydraulic elevation cylinder is substantially exposed.

6. A lifting unit according to claim 1 wherein the valve block is provided with a bypass channel communicating with the first duct on each side of the check valve; and valve means normally blocking the bypass channel and being adapted to open when the pressure of the fluid in either the second port or first chamber reaches selected magnitudes so that fluid can flow out of the first chamber, thereby permitting the piston to shift within the barrel and change the angular position of the boom.

7. A lifting unit according to claim 6 wherein the valve means comprises a valve element shiftably mounted in the valve block for movement from a closed position in which it blocks the bypass channel to open position wherein fluid flows through the bypass channel around the first check valve, the valve element having a first face exposed to fluid in the portion of the bypass channel which communicates with the first chamber and a second face exposed to fluid maintained at substantially the same pressure as the fluid at the second port, the first and second faces being oriented so that when the fluid against them is pressurized the resulting force urges the valve element to open positions; and means for biasing the valve element to the closed position, whereby when the pressure of the fluid against the first or second faces reaches a predetermined magnitude the force exerted by the biasing means will be overcome and the valve element will open.

8. A lifting unit according to claim 7 wherein the valve block is provided with an outer cylinder which is in communication with the second port and an inner cylinder which terminates at a valve seat and is in communication with the first chamber on one side of the valve seat and with the first port on the other side of the valve seat; and the valve element comprises outer and inner pistons shiftably mounted in the outer and inner cylinders, respectively, and an end portion on the piston aligned for sealingwise engagement with the valve seat, the first face being on the end portion and the second face being on the outer piston.

9. A lifting unit comprising a support frame; a mast assembly supported by the support frame; an inner beam journaled to the mast assembly; actuating means for swinging the inner beam with respect to the mast assembly, an outer beam telescopically mounted with respect to the inner beam for extensible movement; and a hydraulic cylinder connected to the inner and outer beams for extending and retracting the outer beam; said hydraulic cylinder comprising a barrel, a piston rod slidably fitted within the barrel, a piston mounted on the inner end of the piston rod and dividing the barrel into first and second chambers, a valve block forming an integral part of the cylinder, the valve block being provided with a first port and a first duct which is connected at its one end to the first port and communicates with the first chamber at its opposite end, the valve block being further provided with a second port and second duct which is connected at its one end to the second port and communicates with the second chamber at its opposite end, and a check valve in the valve block and interposed within the first duct for allowing fluid to flow through the first duct and enter the first chamber but for preventing fluid from flowing reversely out of the first duct and escaping from the first chamber.

10. A lifting device according to claim 9 and further characterized by relief means in the valve block for holding the check valve open when the pressure at the second port exceeds the pressure at the first port by a predetermined amount.

11. A lifting unit according to claim 9 wherein the relief means comprises a pilot check cylinder in the valve block and a pilot check piston mounted in the pilot check cylinder and being shiftable into a position wherein it acts upon and opens the check valve, the pilot check cylinder at a point located beyond the piston being in communication with the second port so that when the pressure at the second port is increased above that at the first port the piston will shift toward the position wherein it acts upon the check valve.

12. A lifting unit according to claim 9 wherein the valve block is mounted on the outer end of the piston rod and forms an integral part thereof.

13. A lifting unit according to claim 10 in which the check valve comprises a poppet slidably mounted in the first duct, a valve seat formed in the first duct, and a spring for urging the poppet into sealingwise engagement with the valve seat, whereby to preclude reverse flow of fluid through the first duct.

14. A lifting unit according to claim 13 in which the relief means comprises a pilot check cylinder formed in the valve block and opening into the first duct at one end adjacent the valve seat, the pilot check cylinder being in communication with the second duct at its opposite end, a pilot check piston slidably mounted in the pilot check cylinder and having an axially projecting nose portion which registers with the poppet, whereby when the pressure at the second port is increased above the pressure at the first port by the predetermined amount the pilot check piston will move toward the valve seat and the nose portion thereof will engage the poppet and lift it off the valve seat so that fluid can flow reversely out of the first chamber.

15. A lifting unit according to claim 12 in which the valve block is secured to the inner beam and the barrel is affixed to the outer beam.

16. A lifting unit for mobile platforms and the like; said lifting unit comprising a support frame mounted on the platform; a mast assembly mounted on the support frame; a boom journaled to the mast assembly; actuating means for swinging the boom with respect to the mast assembly; at least one outrigger mounted on the support frame for engaging the ground in outwardly spaced relation to the support frame, whereby to stabilize the lifting unit; and a hydraulic cylinder for moving the outrigger from a raised transport position to a lowered ground-engaging position; said hydraulic cylinder comprising a barrel, a piston rod slidably fitted within the barrel, a piston mounted on the inner end of the piston rod and dividing the barrel into first and second chambers, the first chamber increasing in volume as the outrigger is lowered into a ground-engaging position, a valve block forming an integral part of the cylinder and having first and second ports and first and second ducts extending from the first and second ports, respectively, the first duct communicating with the first chamber and the second duct communicating with the second chamber, a first check valve in the valve block and normally blocking the first duct, the first check valve being oriented so that it allows fluid to flow from the first port into the first chamber through the first duct but prevents reverse flow of fluid through the first duct, whereby the outrigger is maintained in a ground-engaging position when the fluid pressure at the first port is decreased inadvertently.

17. A lifting unit according to claim 16 and further characterized by first relief means in the valve block for holding the first check valve open when the pressure at the second port exceeds the pressure at the first port by a predetermined amount.

18. A lifting unit according to claim 17 wherein a valve seat is formed in the first duct; the first check valve is a spring-loaded poppet which normally sealingwise engages the valve seat; and the first relief means comprises a first pilot check cylinder in the valve block, a first pilot check piston mounted in the first pilot check cylinder, the first pilot check piston being shiftable into a position where it acts upon and moves the poppet away from the valve seat, the first pilot check cylinder at a point located beyond the first port being in communication with the second port so that when the pressure of the fluid at the second port is increased above that at the first port the first piston will shift toward and move the first poppet, whereby fluid can flow reversely out of the first duct.

19. A lifting unit according to claim 17 and further characterized by a second check valve in the valve block and normally blocking the second duct, the second check valve being oriented so that it allows fluid to flow from the second port to the second chamber but prevents reverse flow of fluid through the second duct; and second relief means in the valve block for holding the second check valve open when the pressure at the first port exceeds the pressure at the second port by a predetermined amount.

20. A lifting unit according to claim 19 in which the first check valve comprises a first poppet slidably mounted in the first duct, a first valve seat formed in the first duct, and a first spring for urging the first poppet into sealingwise engagement with the first valve seat, whereby to preclude reverse flow of fluid through the first duct, and in which the second check valve comprises a second poppet slidably mounted in the second duct, a second valve seat formed in the second duct, and a second spring for urging the second poppet into sealingwise engagement with the second check valve, whereby to preclude reverse flow of fluid through the second duct.

21. A lifting unit according to claim 20 in which the first release means comprises a first pilot check cylinder formed in the valve block and opening into the first duct at one end adjacent the first valve seat, the first pilot check cylinder being in communication with the second duct at its opposite end, and a first pilot check piston slidably mounted in the first pilot check cylinder and having an axially projectnig nose portion which registers with the first poppet, whereby, when the pressure at the second port is increased above the pressure at the first port by the predetermined amount, the first pilot check piston will move toward the first valve seat and the nose portion thereof will engage the first poppet and lift it off the first valve seat so that fluid can flow reversely out of the first chamber; and in which the second release means comprises a first pilot check cylinder formed in the valve block and opening into the second duct at one end adjacent the second valve seat, the second pilot check cylinder being in communication with the first duct at its opposite end, and a second pilot check piston slidably mounted in the second pilot check cylinder and having an axially projecting nose portion which registers with the second poppet, whereby, when the pressure at the first port is increased above the pressure at the second port by the predetermined amount, the second pilot check piston will move toward the second valve seat and the nose portion thereof will engage the second poppet and lift if off the second valve seat so that fluid can flow reversely out of the second chamber.

22. A lifting unit according to claim 16 wherein the valve block is mounted on the outer end of the piston rod and forms an integral part thereof.

23. A lifting unit according to claim 22 in which the outrigger is provided with a shoe for engaging the ground, the valve block being journaled to the outrigger adjacent the support frame and the sealed end of the barrel being journaled to the outrigger adjacent the shoe.

References Cited
UNITED STATES PATENTS

| | | | |
|---|---|---|---|
| 3,035,712 | 5/1962 | Nowack | 212—39 |
| 3,249,336 | 5/1966 | Brown et al. | 212—35 |
| 3,282,441 | 11/1966 | Stauffer | 212—35 |
| 3,300,060 | 1/1967 | Lado | 212—55 |
| 3,315,820 | 4/1967 | Stauffer | 212—35 |

ANDRES H. NIELSEN, *Primary Examiner.*